(12) United States Patent
Lin

(10) Patent No.: US 11,341,175 B2
(45) Date of Patent: May 24, 2022

(54) KEYWORD RANKING FOR QUERY AUTO-COMPLETION BASED ON PRODUCT SUPPLY AND DEMAND

(71) Applicant: MERCARI, INC., Tokyo (JP)

(72) Inventor: Yanpeng Lin, Tokyo (JP)

(73) Assignee: MERCARI, INC., Tokyo (JP)

(*) Notice: Subject to any disclaimer, the term of this patent is extended or adjusted under 35 U.S.C. 154(b) by 105 days.

(21) Appl. No.: 16/672,059

(22) Filed: Nov. 1, 2019

(65) Prior Publication Data

US 2021/0133225 A1  May 6, 2021

(51) Int. Cl.
*G06F 16/33* (2019.01)
*G06F 16/332* (2019.01)
*G06K 9/62* (2022.01)
*G06Q 30/02* (2012.01)

(52) U.S. Cl.
CPC ...... *G06F 16/3334* (2019.01); *G06F 16/3322* (2019.01); *G06F 16/3349* (2019.01); *G06K 9/6215* (2013.01); *G06Q 30/0202* (2013.01)

(58) Field of Classification Search
CPC ............ G06F 16/3334; G06F 16/3322; G06F 16/3349; G06K 9/6215; G06Q 30/0202
See application file for complete search history.

(56) References Cited

U.S. PATENT DOCUMENTS

| | | | |
|---|---|---|---|
| 2007/0214131 A1* | 9/2007 | Cucerzan | G06F 16/951 |
| 2008/0301089 A1* | 12/2008 | Makeev | G06F 16/951 |
| 2011/0314010 A1* | 12/2011 | Ganti | G06F 16/2425 |
| | | | 707/728 |
| 2020/0125648 A1* | 4/2020 | Jiang | G06F 16/285 |

* cited by examiner

*Primary Examiner* — Mark D Featherstone
*Assistant Examiner* — Samuel C Sharpless, III
(74) *Attorney, Agent, or Firm* — Morgan, Lewis & Bockius LLP

(57) ABSTRACT

For query auto completion (QAC) in an eCommerce platform with constantly changing product supply and demand, a Query Mover's Distance (QMD) framework for ranking queries is used, which formulates QAC as an optimal transport problem balancing product demand and supply.

20 Claims, 9 Drawing Sheets

$$d(t_i, t_j) = \operatorname{sqrt}(\operatorname{sum}((t_{iz}-t_{jz})^2)) \text{ where } z = 1, 2, \ldots, 128$$

KEYWORD RANKING FOR QUERY AUTO-COMPLETION BASED ON PRODUCT SUPPLY AND DEMAND

TECHNICAL FIELD

The present invention relates generally to information retrieval in computer systems and, more particularly, to query auto-completion for product retrieval in an online marketplace.

DESCRIPTION OF THE RELATED ART

Query auto-completion (QAC), suggesting one or more ways to expand a user's query prefix to a full query, is a key feature of product retrieval interfaces in eCommerce. The goal of QAC is to reduce the user's effort during the search process. There is a large body of work on generating QAC ranking lists from heuristic approaches, such as Most Popular Keyword (MPK), to machine learning-based approaches.

MPK is the intuitive approach of sorting QAC candidates by usage frequency. Learning-based approaches such as time-sensitive or user-centered approaches are relatively recent approaches that add query-side features such as query time, query location, and query behavior.

However, these existing approaches do not consider the index-side dynamic (product information change). Product retrieval may be seen as a matching problem between users' product information demand and product information supply, particularly in a consumer-to-consumer (C2C) online marketplace where product information change cannot be assumed to be static. Accordingly, an improved product retrieval interface accounting for changes in product information supply and demand is desired.

SUMMARY

A method of providing query autocomplete functionality in a computer system is disclosed. Costs are determined between search terms and result terms. An Earth Mover's Distance (EMD) matching is performed between the search terms and the result terms based on the costs, frequencies of the search terms, and frequencies of the result terms. The search terms are evaluated based on the EMD matching to produce an evaluation of the search terms.

In an eCommerce system, users ("$\{u_i\}$") submit queries ("$\{q_j\}$") to search for products ("$\{p_k\}$"). A server system stores the queries and product information.

The search terms and the result terms may be updated in real-time. The server system may receive a search prefix from a user intending to submit a query and may suggest at least one query to the user based on the search prefix and the evaluation of the search terms. Queries ($\{q_j\}$) and search results ($\{p_k\}$) may be tokenized to obtain the search and result terms ("$t_1, t_2, \ldots, t_N$"). The computer system may be an online consumer-to-consumer marketplace, and the result terms may be derived from information in the marketplace.

By the claimed inventions, a query ranking may be obtained having the effect of ranking queries in view of their product retrieval efficiency. Certain embodiments below show specific methods for obtaining the query ranking.

In the course of the query ranking, a graph representation, which illustrates connections among users, queries, terms, and products, will be shown to be useful to analyze the efficiency of the retrieval. Such a graph may be constructed from users' search logs. To this end, the query and/or the product are tokenized into a series of terms.

A value showing a joint probability of a term pair resulting in a product click may be attached to each term pair, the joint probability being expressed in terms of the numbers of product clicks resulting from term pairs.

There may be many ways to estimate a local proximity between two terms. One exemplary embodiment includes a term vector optimization. The term vector representation utilizes a d-dimensional real vector representation of the terms. The vector representation may be optimized so as to minimize the difference between the joint probability and the correlation based on the inner product ("score of a pair of terms") between two vectors.

From a vector representation of the terms, a cost matrix between the terms may be constructed by means of the Euclidean distances therebetween.

Evaluating the search terms in view of their efficiency of product retrieval may include assigning a score to each of the search terms ("term scoring"). The term scoring may be performed by determining a number of the result terms ("transportation optimization") that each of the search terms is most efficient in yielding according to the EMD matching.

To perform the EMD matching, constraints both from the query side ("demand") and the product side ("supply") are used. The demand ("$f_i$") may be obtained by tokenizing each query and aggregating the multiple terms. The supply ("$\hat{f}_j$") may be obtained by aggregating product term distribution.

The EMD matching with demand and supply constraints provides a moving matrix ("$M_{ij}$") which indicates the most efficient term for linking a query and a product as the largest value in each column. Hence, the moving matrix provides each term with a score.

Once the term scoring is assigned, a query ranking based on search terms and their respective scores may be produced. The scores of the search terms in each of the queries may be combined to produce a combined score for each of the queries. The queries may be ranked according to their combined scores. Combining scores may have the advantageous effect of demoting queries that only reflect a broad search intention.

A computer system for generating term scores and/or query scores is disclosed. The computer system may have at least one processor, memory, and one or more programs stored in the memory. The one or more programs have instructions for determining costs between search terms and result terms, performing an Earth Mover's Distance (EMD) matching between the search terms and the result terms based on the costs, frequencies of the search terms, and frequencies of the result terms, and evaluating the search terms based on the EMD matching to produce an evaluation of the search terms.

A non-transitory computer-readable storage medium storing one or more programs to realize a method including a term/query scoring is disclosed. The one or more programs are configured for execution by a computer system having at least one processor and memory. The one or more programs have instructions for determining costs between search terms and result terms, performing an Earth Mover's Distance (EMD) matching between the search terms and the result terms based on the costs, frequencies of the search terms, and frequencies of the result terms, and evaluating the search terms based on the EMD matching to produce an evaluation of the search terms.

DETAILED DESCRIPTION

Figure 1:
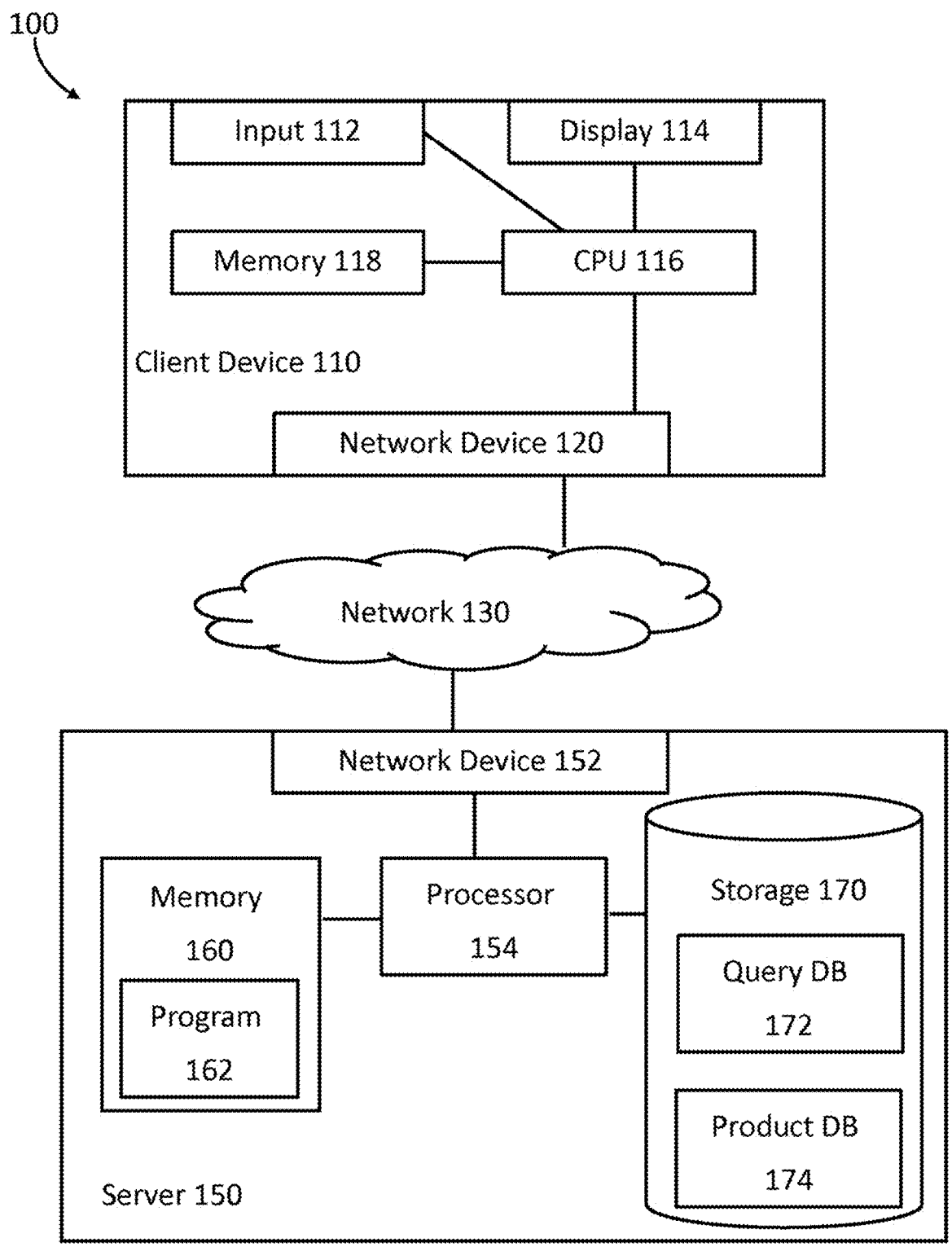
FIG. 1 is a block diagram of a computer system in accordance with an embodiment of the present invention.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a variety of different configurations, all of which are explicitly contemplated herein.

FIG. 1 illustrates a computer system 100 in accordance with an embodiment of the present invention. The computer system may be used for performing the methods described below. Computer system 100 includes a client device 110 and a server system 150 connected by a network 130. Network 130 in an exemplary embodiment is the Internet. However, network 130 may be any kind of network, such as a local area network or a wide area network. Client device 110 includes an input device 112 for user input and a display device 114 for output to the user. User device 110 further includes a CPU 116 and memory 118. A network device 120 connects user device 110 to network 130.

In an exemplary method of using client device 110, a user views an eCommerce interface such as a webpage having a search box on display 114. The user inputs a query prefix, which may be a text string of at least one term, into the search box through input 112 to search for a product. CPU 116 detects the input and sends a request including the input through network device 120 to server system 150. In response to the request, network device 120 receives data from server system 150, for example, providing query suggestions to be placed in an autocomplete dropdown menu of the search box. CPU 116 processes the data, storing data in and retrieving data from memory 118 as necessary, and displays the autocomplete dropdown menu on the webpage on display 114. The user may similarly use client device 110 to access server system 150 for other purposes permitted by server system 150, such as placing products for sale and purchasing products.

Server system 150 in the present embodiment is a server system for an online consumer-to-consumer marketplace. In particular, the server system 150 is configured to return a search result, i.e., candidate for searched product, to the user via the network 130 when it receives a query from the client device 110. However, other embodiments of server system 150 may belong to any eCommerce system or any system having information search and retrieval features. Server system 150 may be a cloud-based system. Server system 150 is connected to network 130 through a network device 152.

Server system 150 includes a processor 154, memory 160, and storage 170. Memory 160 may be a non-transitory computer readable medium storing a program 162 for autocompletion of a user query prefix, as will be described below. In some embodiments, program 162 may be stored in any kind of tangible non-transitory computer readable medium including, without limitation, hard drives, RAM, CDs, DVDs, thumb drives, solid state devices, floppy disks, tape devices, etc., and program 162 may be loaded into memory 160 from such a tangible non-transitory computer readable medium. Memory 160 may further include any lists, tables, matrices, etc. providing autocomplete functionality to computer system 100. For example, memory 160 may include tokenized search and/or result term frequency tables, a query ranking list, a cost matrix, a moving matrix, or any other data structure described below. Alternatively, such data structures may be stored, in part or in whole, in storage 170, a cache, removable media, etc. As the data structures may be quite large in an eCommerce system, each data structure may be stored in and/or operated on in a corresponding module, for example, a term frequency module, a query ranking module, a cost matrix module, and a moving matrix module.

Storage 170 includes a query database 172 and a product database 174. Query database 172 logs queries input by users as well as which product pages, if any, the users clicked on based on the results yielded by the queries. Product database 174 includes a list of products for sale as well as information about the products. User query behavior may change rapidly according to user demand for different products, and product information may change rapidly as products are sold and new products are placed for sale. Accordingly, query database 172 and product database 174 may be updated in real-time.

Server system 150 may receive a variety of requests from devices such as client device 110 through network device 152. Processor 154 processes the requests and responds as appropriate according to the particular type of request and the content of the request. In the case of the request including a query prefix, server system may respond with suggested completed queries as described below.

Figure 2:
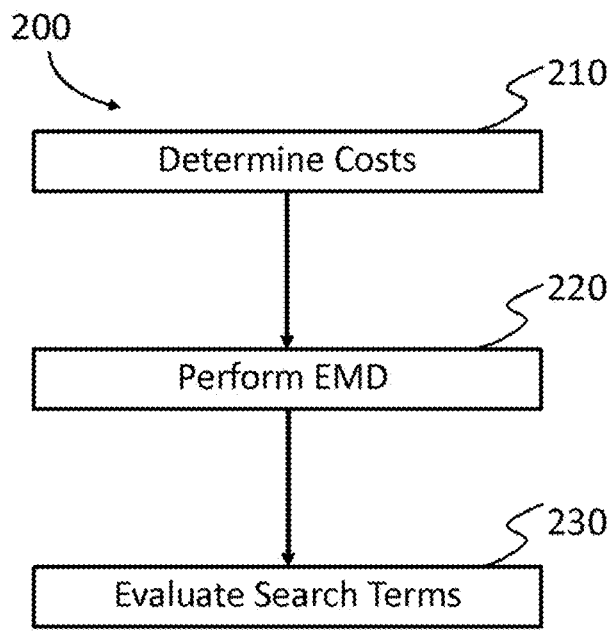
FIG. 2 is a flowchart of a method of providing query autocomplete functionality comprising the term scoring in a computer system in accordance with an embodiment of the present invention.

FIG. 2 illustrates an exemplary method of providing query autocomplete functionality comprising term scoring in a computer system such as computer system 100. Autocomplete method 200 formulates query auto-completion as a transportation optimization problem giving a term/query scoring based on product retrieval efficiency. The processor 154 in FIG. 1 is able to perform the autocomplete method or the term/query scoring by means of the program 162 on the memory 160.

Accordingly, autocomplete method 200 begins with the step 210 of determining travel costs $(d(t_i, t_j))$ that estimate a local proximity between two terms, i.e., degree of semantic similarity or dissimilarity between terms. Using these travel costs, an Earth Mover's Distance (EMD) transportation optimization is performed in step 220 to identify a moving matrix ("$M_{ij}$"), providing a term scoring, in which higher scores indicate greater efficiency in linking search terms with result terms. Finally, in step 230, the search terms are evaluated based on the EMD optimization to produce a ranking of queries in a manner that balances product supply and demand. A query prefix input by a user can then be easily autocompleted by suggesting to the user the highest ranking queries beginning with the prefix. In an alternative embodiment, a user's query prefix may considered prior to any of steps 210, 220, or 230 to reduce the size of the term dictionary to terms beginning with that prefix in order to reduce computational complexity and/or system resource requirements. Step 210 may be performed at least in part by a cost matrix module of system 100. Step 220 may be performed at least in part by a moving matrix module of system 100. Step 230 may be performed at least in part by a query ranking module of system 100.

Figure 3:
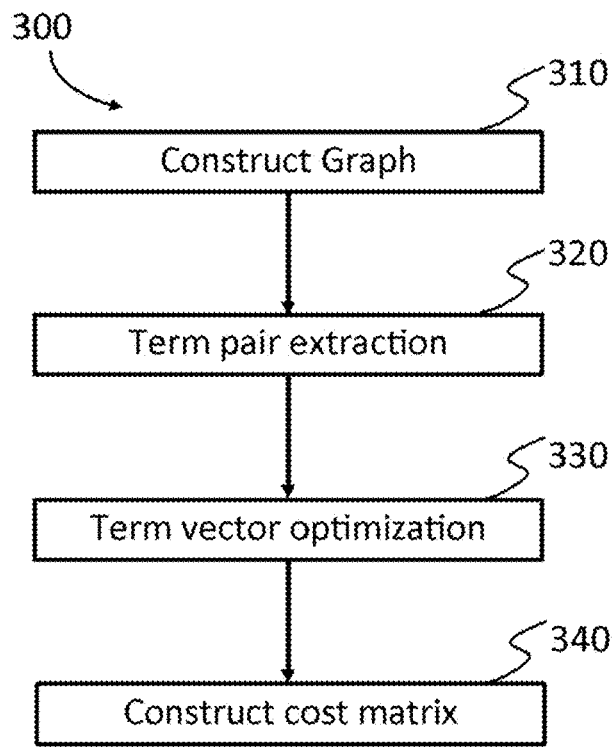
FIG. 3 is a flowchart of cost matrix construction in accordance with an embodiment of the present invention.

FIG. 3 depicts an exemplary implementation of step 210 of determining travel costs ($d(t_i, t_j)$) that estimate a local proximity between two terms. Travel costs determination method 300 may begin with step 310 of graph construction, in which a graph is constructed to identify terms having semantic similarity. The query ($\{q_j\}$) or the product ($\{p_k\}$) is tokenized into a series of terms ("$t_1, t_2, \ldots, t_N$"). In step 320, these term pairs are extracted from the graph and assigned joint probabilities ($P(i, j)$) of resulting in a product click depending on the resulting number of product clicks and the number of different queries from different users including the terms. In step 330, the joint probabilities are used to construct and optimize term vectors ($\{\vec{t}_i\}$) as semantic representations of the terms. In step 340, a cost matrix ($d(\vec{t}_i, \vec{t}_j)$) is constructed representing travel costs as Euclidean distances between pairs of term vectors. Steps 310, 320, 330, and 340 will be described in greater detail below. In an alternative embodiment, term vectors may be fetched from an externally generated semantic vector database.

Figures 4, 5:
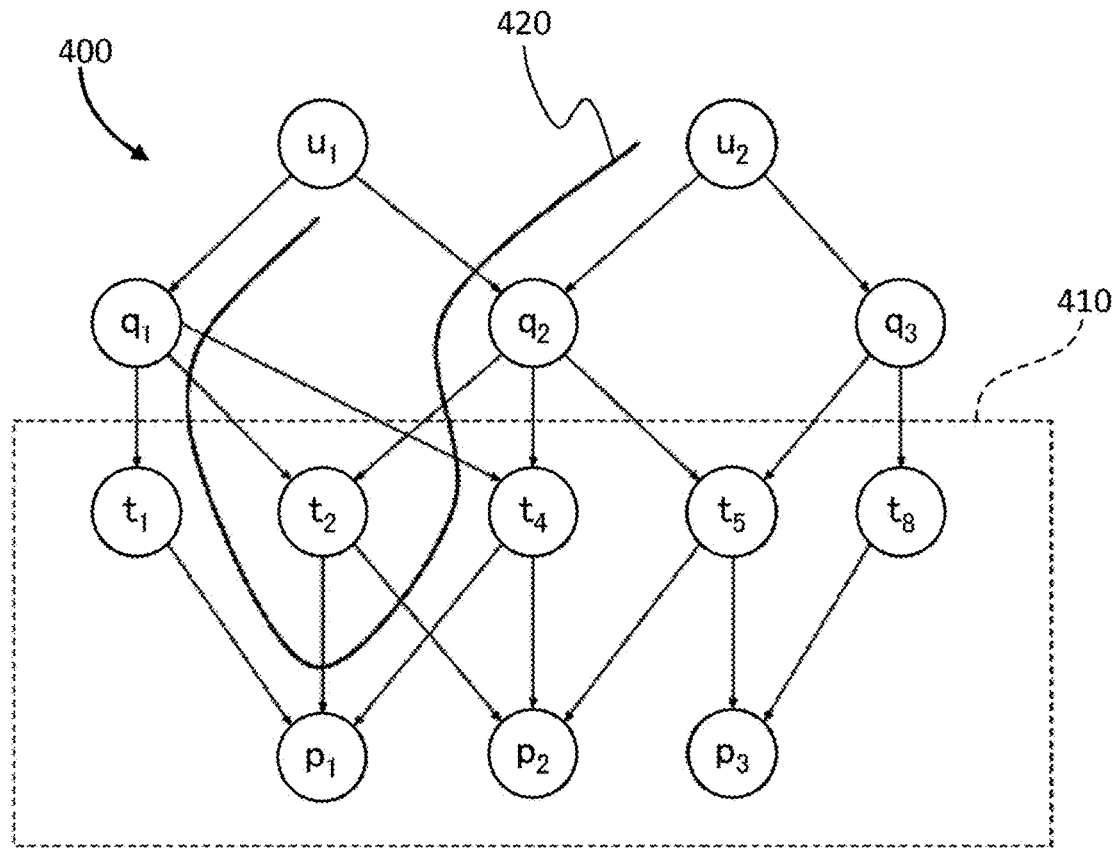
FIG. 4 illustrates a product click graph in accordance with an embodiment of the present invention.
FIG. 5 illustrates a cost matrix in accordance with an embodiment of the present invention.

FIG. 4 illustrates graph construction according to step 310. Query information stored in query database 172 may be used to construct a product click graph 400 from which pairs of terms having semantic similarity are extracted. In some embodiments, graph 400 may be extremely complex and be constructed from query information over any time window. As such, graph 400 may be constructed in a graph construction module of system 100. However, for the illustrative purposes, the present depiction of graph 400 includes query information regarding only a few users, queries, and product clicks. Graph 400 includes users $u_1$ and $u_2$. User $u_1$ generated queries $q_1$ and $q_2$, and user $u_2$ generated queries $q_2$ and $q_3$. Query $q_1$ resulted in the selection of product $p_1$, query $q_2$ resulted in the selection of products $p_1$ and $p_2$, and query $q_3$ resulted in the selection of product $p_3$.

Queries in graph 400 are tokenized in order identify and extract pairs of terms having semantic similarity. Query $q_1$ is tokenized into terms $t_1, t_2,$ and $t_4$, query $q_2$ is tokenized into terms $t_2, t_4,$ and $t_5$, and query $q_3$ is tokenized into terms $t_5,$ and $t_6$. For example, $q_1$="Reiwa clear file" is tokenized into terms $t_1$="Reiwa", $t_2$="clear", and $t_4$="file". Terms are considered to have semantic similarity if they are generated by different queries from different users and result in the same product selection. In alternate embodiments, semantic similarity additionally may be informed by other means, such as different queries from the same user. Edges within bipartite graph 410 from different terms to a common product are analyzed for indicating semantic similarity. For example, terms $t_1$ and $t_2$ have semantic similarity because they both result in the selection of product $p_1$. Terms $t_2$ and $t_4$ have even greater semantic similarity because they result in the selection of products $p_1$ and $p_2$. Terms with semantic similarity can be visualized by drawing a line between different queries from different users resulting in the same product selection. For example, line 420 illustrates semantic similarities between terms $t_1, t_2,$ and $t_4$, as they all resulted in the selection of product $p_1$ while originating from different users $u_1, u_2$ and queries $q_1, q_2$.

According to step 320, the following term pairs and corresponding number of common product clicks can be extracted from bipartite graph 410:

| | | | | |
|---|---|---|---|---|
| $<t_1, t_2> = 1$ | $<t_1, t_4> = 1$ | $<t_1, t_5> = 0$ | $<t_1, t_6> = 0$ | $<t_2, t_4> = 2$ |
| $<t_2, t_5> = 1$ | $<t_2, t_6> = 0$ | $<t_4, t_5> = 1$ | $<t_4, t_6> = 0$ | $<t_5, t_6> = 1$ |

For example, terms $t_1$ and $t_2$ have one product click in common (product $p_1$), terms $t_2$ and $t_4$ have two product clicks in common (products $p_1$ and $p_2$), and terms $t_4$ and $t_6$ have no product clicks in common. The above term pair product clicks can be expressed as joint probabilities by normalizing the total probability, i.e., the numerator is the number of common product clicks for that pair, and the denominator is the total number of common products clicks for all term pairs.

| | | | | |
|---|---|---|---|---|
| $P(1, 2) = 1/7$ | $P(1, 4) = 1/7$ | $P(1, 5) = 0$ | $P(1, 6) = 0$ | $P(2, 4) = 2/7$ |
| $P(2, 5) = 1/7$ | $P(2, 6) = 0$ | $P(4, 5) = 1/7$ | $P(4, 6) = 0$ | $P(5, 6) = 1/7$ |

FIG. 5 illustrates construction of a cost matrix 500 having costs 510 expressed as ($d(t_i, t_j)$), which estimate a local proximity between two terms, i.e., degree of semantic similarity or dissimilarity, between terms in accordance with step 340.

There may be many practical ways to estimate a local proximity between two terms. One exemplary embodiment includes a term vector optimization. The term vector representation utilizes a d-dimensional real vector representation of the terms. For a given term $t_i$, a d-dimensional real vector $\vec{t}_i \in \mathbb{R}^d$ is assigned. The vector representation may be optimized so as to minimize the difference between the joint probability and the correlation based on the inner product ("score of a pair of terms") between two vectors.

The joint probabilities above are used to derive term vectors of each term's semantic representation in a d-dimensional real vector space $\mathbb{R}^d$, where each term $t_i$ belongs to a term dictionary T of size N. The vectors are optimized by calculating:

$$\hat{P}(i, j) = \frac{1}{1 + \exp(-\vec{t}_i^T \vec{t}_j)}$$

Such that the difference between $\log(P(i, j))$ and $\log(\hat{P}(i, j))$ is minimized:

$$\text{minimize } O_1 = KL(P\|\hat{P}) = \Sigma P(i,j) \log(P(i,j)/\hat{P}(i,j))$$

As seen in FIG. 5, costs 510 between each pair of terms $t_i, t_j$ are calculated as the Euclidean distance between their term vectors $\vec{t}_i, \vec{t}_j$, i.e. $d(t_i, t_j) = \text{sqrt}(\text{sum}(t_{iz} - t_{jz})^2)$, where z=1, 2, . . . , d, and term vectors having a shorter Euclidean distance have greater semantic similarity.

Figure 6:
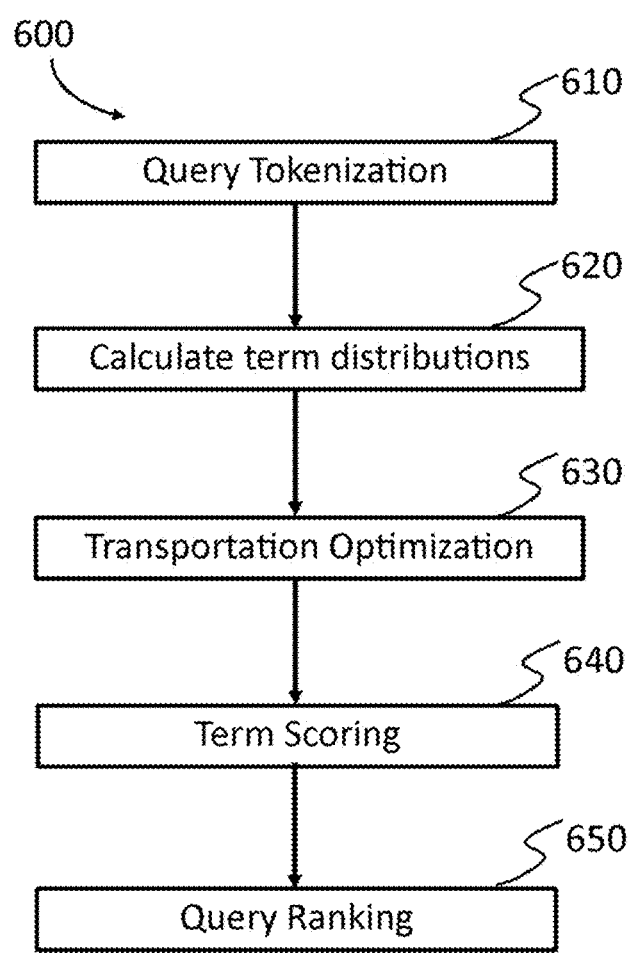
FIG. 6 is a flowchart of query evaluation in accordance with an embodiment of the present invention.

FIG. 6 illustrates an EMD optimization and query evaluation method 600 for scoring terms and ranking queries according to steps 220 and 230. To perform the EMD optimization, constraints both from the query side ("demand") and the product side ("supply") are applied. The demand ("$f_i$") may be obtained by tokenizing each query and aggregating the multiple terms. The supply ("$\hat{f}_j$") may be obtained by aggregating product term distribution.

In step 610, queries are tokenized into query terms and their frequencies are determined. In step 620, a product term distribution is formed. In step 630, an EMD matching is performed between the query terms and the product terms. In step 640, query terms are scored according to the EMD matching. In step 650, the queries are ranked based on the query scores. Steps 610, 620, 630, 640, and 650 will be described in greater detail below.

Figure 7:
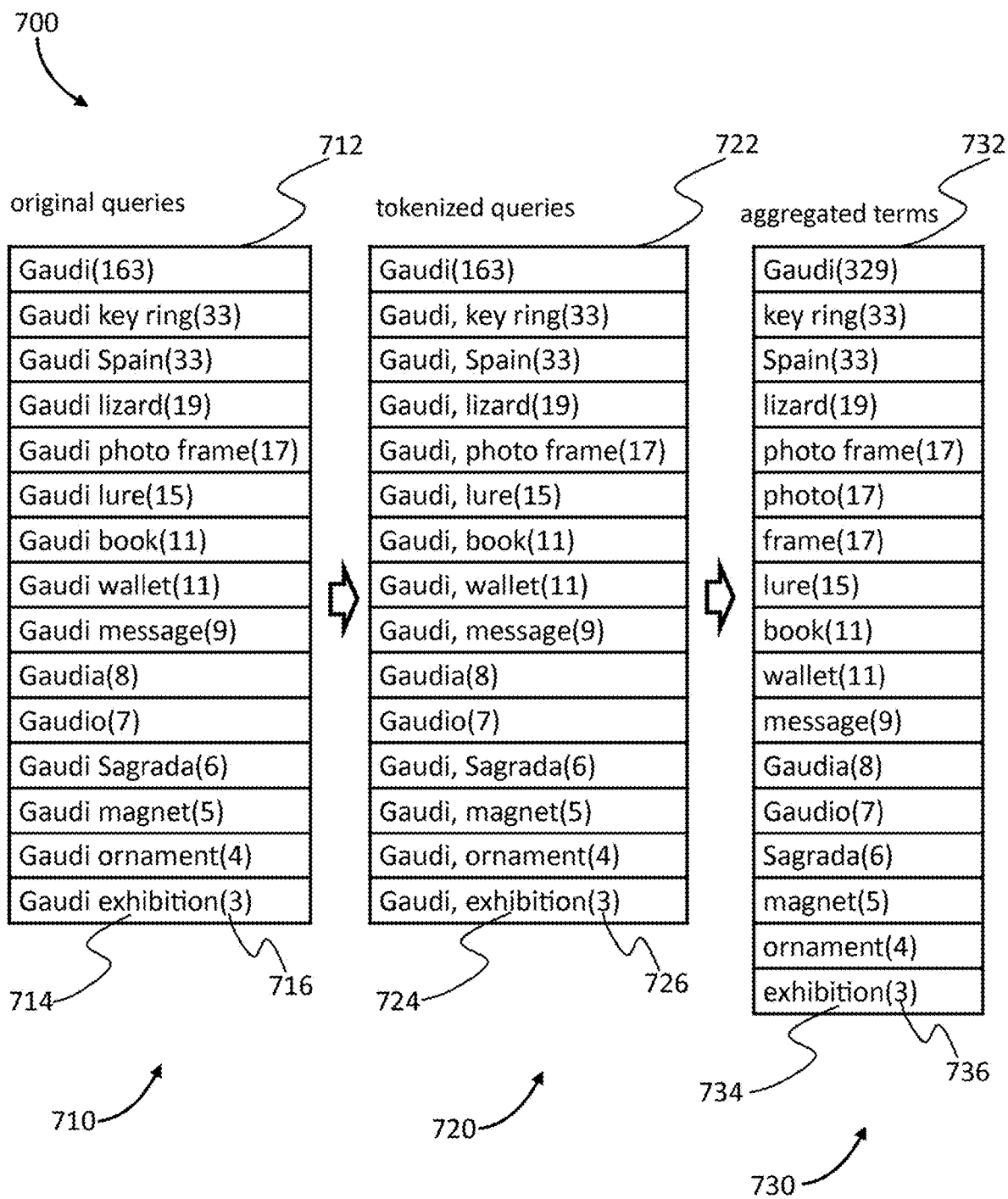
FIG. 7 illustrates aggregation of query terms in accordance with an embodiment of the present invention.

FIG. 7 illustrates query term distribution formation method 700, which may correspond to step 610 in FIG. 6. Query term distribution formation method 700 may be performed at least in part in a term frequency module of system 100. In step 710, original query table 712, which includes original queries 714 having corresponding original frequencies 716, is retrieved from query database 172. For example, original query "Gaudi key ring" and its corresponding frequency of 33 is retrieved. In step 720, tokenized query table 722 is formed by tokenizing original queries 714 into tokenized query terms 724 having corresponding tokenized query frequencies 726 equal to the original frequencies 716 of their respective original queries 714. For example, original query "Gaudi key ring" is tokenized into "Gaudi" and "key ring" each with tokenized query frequencies of 33. Then, in step 730, the tokenized query frequencies 726 are aggregated for the same tokenized query terms 724 from different original queries 714. The resulting aggregated frequencies 736 and stored with each aggregated query term 734 in aggregated terms table 732. For example, tokenized query frequencies for tokenized query term "Gaudi" are aggregated across tokenized query table 722 to yield an aggregated frequency of 329. Aggregated terms table 732 represents a query terms distribution 920 (FIG. 9) and is preferably updated in real-time to account for sudden changes in product demand.

Figure 8:
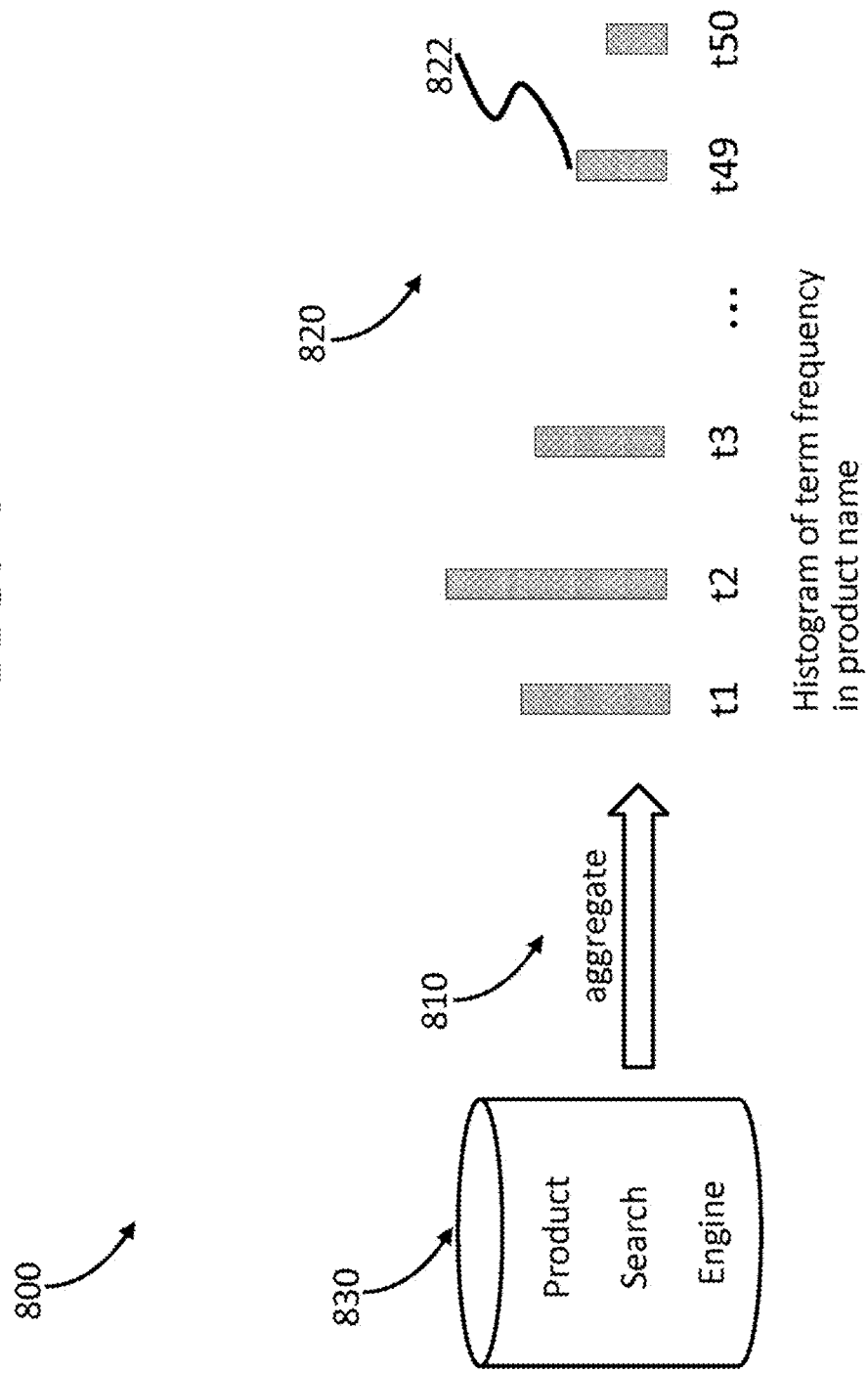
FIG. 8 illustrates aggregation of product terms in accordance with an embodiment of the present invention.
Figure 9:
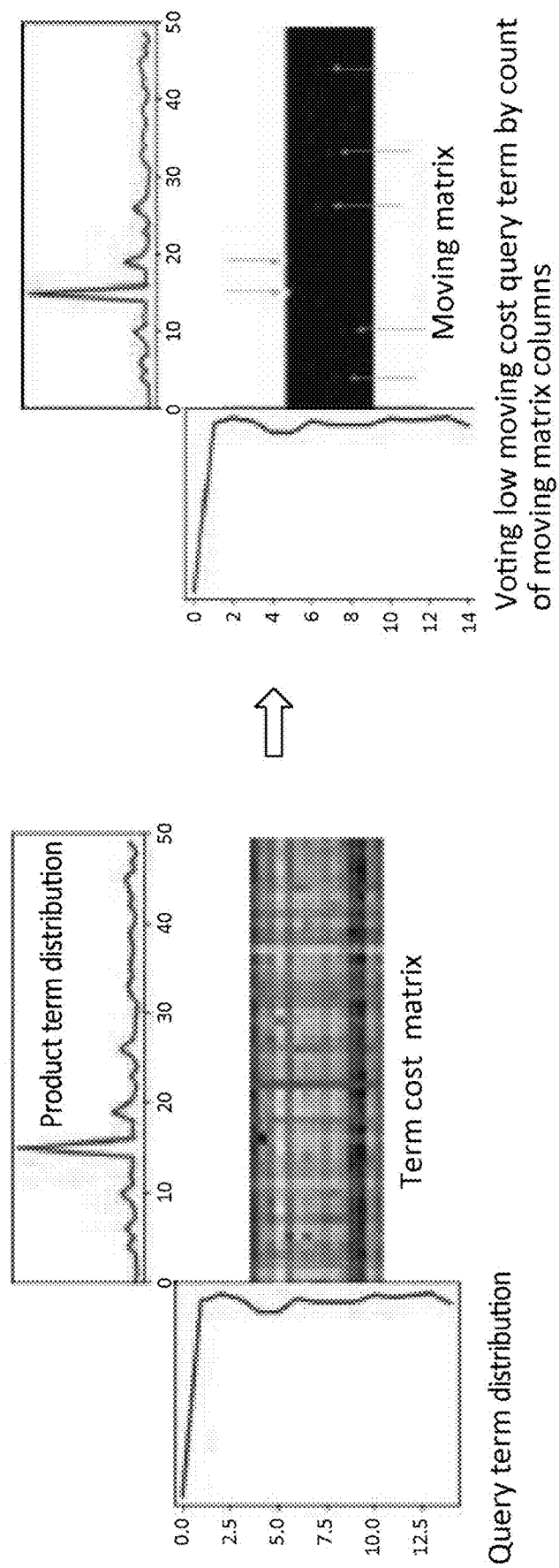
FIG. 9 illustrates an Earth Mover's Distance optimization in accordance with an embodiment of the present invention.

Similarly, product term distribution formation step 800, which may correspond to step 620 in FIG. 6, produces a product term histogram 820, as seen in FIG. 8. Product term distribution formation method 800 may be performed at least in part in a term frequency module of system 100. In step 810, product term frequencies 822 are generated from product information obtained through product search engine 830 that searches through the online marketplace for product names. Additionally or alternatively, product information may be retrieved from product database 174. In one embodiment, the product term frequencies 822 are determined from their frequencies in product names. In other embodiments, product term frequencies may be determined by additional product information, such as a product summary, description, or tags. Each product name is tokenized into product terms. Then, the frequencies of each of the product terms are aggregated to determine the product term frequencies 822, which may be represented as a product term histogram 820 to be used as a product term distribution 930 (FIG. 9). The product term distribution 930 is preferably updated in real-time to account for sudden changes in product supply.

An Earth Mover's Distance (EMD) transportation optimization 900 is schematically illustrated in FIG. 9, in accordance with step 630. Cost matrix 910, query term distribution 920, and product term distribution 930 are used to perform EMD transportation optimization 900. More specifically, the EMD transportation optimization may be performed by the following minimization:

$$\min_{M \geq 0, \lambda > 0} \sum_{i,j=1} M_{i,j} d(\vec{t}_i, \vec{t}_j) - \frac{1}{\lambda} h(M)$$

Subject to:

$$\sum_{j=1}^{n} M_{i,j} = f_i$$

$$\sum_{i=1}^{N} M_{i,j} = \hat{f}_j$$

Wherein M is cost matrix 910, h(M) is an entropy function, and λ is a Lagrange multiplier. The result of the EMD transportation optimization 900 is a moving matrix 950 in which each largest column value 960 indicates the query term most efficient in linking to the product term of that column.

Figure 10:
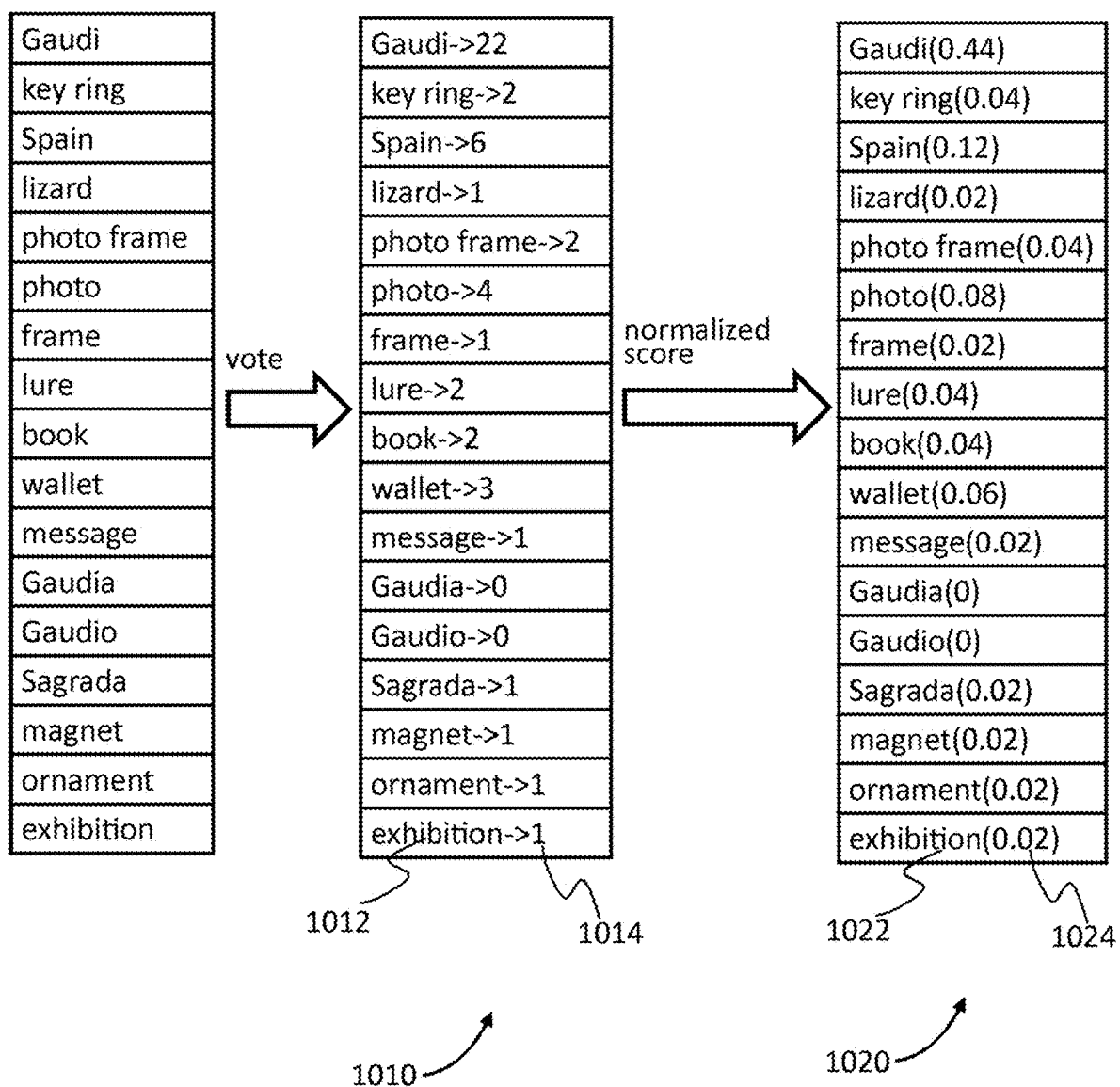
FIG. 10 illustrates term scoring in accordance with an embodiment of the present invention.

FIG. 10 illustrates query term scoring method 1000 as an exemplary embodiment of step 640. In step 1010, "voting" is performed for query terms 1012. Each column in moving matrix 950 provides one vote for the query term 1012 corresponding to the largest column value 960 in that column to provide a raw score 1014 for each query term 1012. For example, "Spain" was the highest value in six columns of the moving matrix 950, resulting in a raw score of 6. In step 1020, the raw scores are normalized to produce normalized scores 1024. For example, the raw for of 6 for "Spain" was normalized to 0.12 because the moving matrix has 50 columns.

Figure 11:
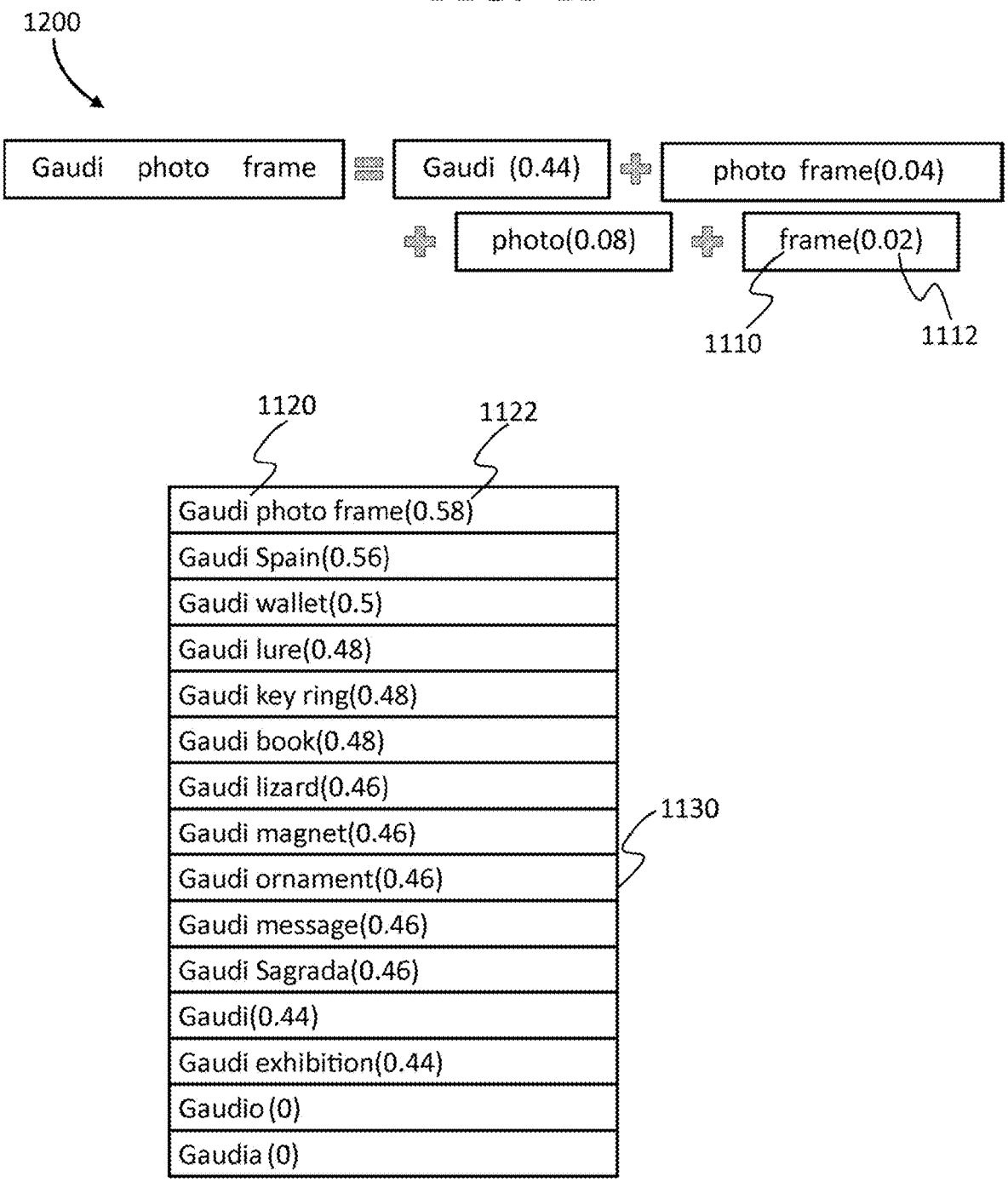
FIG. 11 illustrates query ranking in accordance with an embodiment of the present invention.

FIG. 11 illustrates query ranking method 1100 as an exemplary embodiment of step 650. Normalized scores 1112 of query terms 1110 are added together to reform original queries 1120 having query scores 1122. For example, original query "Gaudi photo frame" has a query score of 0.58 equal to the sum of the scores for "Gaudi" (0.44), "photo frame" (0.04), "photo" (0.08), and "frame" (0.02). Original queries 1120 are then ranked in ranking table 1130 according to their query scores 1122. Original queries 1120 with the highest query scores 1122 for a particular prefix input by a user may be presented to the user as suggestions for completing the prefix. In other embodiments, only one of original queries 1120 or, in some cases, such as scores for the prefix being extremely low or no product names including that prefix, none of original queries 1120 are presented to the user.

Query ranking method 1100 over a large term dictionary is expected to generate a ranking substantially different than an MPK ranking or any ranking heuristic that considers only query-side (demand) information. Further, it is expected that query ranking method 1100 will result in a greater ratio of autocomplete suggestions resulting in product clicks than heuristics that do not consider both product demand and supply, thereby providing an improved eCommerce interface between users and an eCommerce platform.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of providing query autocomplete functionality in a computer system, the method comprising:
   tokenizing a plurality of terms from a plurality of search queries to obtain a plurality of search terms;
   tokenizing a plurality of search results corresponding to the search queries, to obtain a plurality of result terms;
   constructing a cost matrix for the plurality of search terms, wherein the cost matrix includes a plurality of entries and each of the entries represents a respective semantic similarity of a pair of search terms identified from the plurality of search terms, wherein constructing the cost matrix comprises:
      identifying, from the plurality of search terms, a plurality of pairs of search terms having semantic similarity, wherein a pair of search terms is semantically similar when terms in the pair are generated by distinct queries and result in the same product selection;
      assigning a respective joint probability for each of the identified pairs of search terms, the respective joint probability comprises a ratio of a number of product clicks of the identified pair of search terms and a total number of product clicks for all the pairs of search terms;
      generating a plurality of term vectors based on the joint probabilities, each of the term vectors having a respective Euclidean distance, wherein a shorter Euclidean distance corresponds to greater semantic similarity; and
      constructing the cost matrix that includes the plurality of term vectors;
   generating a search terms distribution based on frequencies of the plurality of search terms;
   generating a result terms distribution based on frequencies of the plurality of result terms;
   performing an Earth Mover's Distance (EMD) matching between the search terms and the result terms based on the cost matrix, the search terms distribution, and the result terms distribution; and
   evaluating the search terms based on the EMD matching to produce an evaluation of the search terms.

2. The method of claim 1, further including updating in real-time the search terms and the result terms.

3. The method of claim 1, further including:
   receiving a search prefix from a user; and
   suggesting to the user at least one query based on the search prefix and the evaluation of the search terms.

4. The method of claim 1, wherein the computer system is an online consumer-to-consumer marketplace and the result terms are derived from information in the marketplace.

5. The method of claim 1, wherein evaluating the search terms comprises:
   assigning a score to each of the search terms by determining a number of the result terms that each of the search terms is most efficient in yielding according to the EMD matching.

6. The method of claim 5, further comprising:
   producing a list of queries including the search terms;
   combining the scores of the search terms in each of the queries to produce a combined score for each of the queries; and
   ranking the queries according to the combined scores.

7. The method of claim 1, wherein:
   the frequencies of the search terms are determined by a number of users that searched for each of the search terms; and
   the frequencies of the result terms are determined by a number of search results that include each of the result terms.

8. The method of claim 1, further comprising:
   identifying, from the plurality of search terms, a plurality of pairs of search terms; and
   weighting each of the pairs of search terms according to a number of common search results yielded by the pair of the search terms.

9. The method of claim 1, further comprising calculating a cost between a search term of the search terms and a result term of the result terms as a Euclidean distance between vectors representing the search term and the result term.

10. A computer system, comprising:
    at least one processor;
    memory; and
    one or more programs stored in the memory, the one or more programs comprising instructions for:
       tokenizing a plurality of terms from a plurality of search queries to obtain a plurality of search terms;
       tokenizing a plurality of search results corresponding to the search queries, to obtain a plurality of result terms;
       constructing a cost matrix for the plurality of search terms, wherein the cost matrix includes a plurality of entries and each of the entries represents a respective semantic similarity of a pair of search terms identified from the plurality of search terms, wherein constructing the cost matrix comprises:
          identifying, from the plurality of search terms, a plurality of pairs of search terms having semantic similarity, wherein a pair of search terms is semantically similar when terms in the pair are generated by distinct queries and result in the same product selection;
          assigning a respective joint probability for each of the identified pairs of search terms, the respective joint probability comprises a ratio of a number of product clicks of the identified pair of search terms and a total number of product clicks for all the pairs of search terms;
          generating a plurality of term vectors based on the joint probabilities, each of the term vectors having a respective Euclidean distance, wherein a shorter Euclidean distance corresponds to greater semantic similarity; and constructing the cost matrix that includes the plurality of term vectors;
       generating a search terms distribution based on frequencies of the plurality of search terms;
       generating a result terms distribution based on frequencies of the plurality of result terms;
       performing an Earth Mover's Distance (EMD) between the search terms and the result terms based on the cost matrix, the search terms distribution, and the result terms distribution; and
       evaluating the search terms based on the EMD matching to produce an evaluation of the search terms.

11. The computer system of claim 10, wherein the instructions further include updating in real-time the search terms and the result terms.

12. The computer system of claim 10, wherein the instructions further include:

receiving a search prefix from a user; and
suggesting to the user at least one query based on the search prefix and the evaluation of the search terms.

13. The computer system of claim 10, wherein the computer system is an online consumer-to-consumer marketplace and the result terms are derived from information in the marketplace.

14. The computer system of claim 10, wherein the instructions for evaluating the search terms comprises instructions for:
assigning a score to each of the search terms by determining a number of the result terms that each of the search terms is most efficient in yielding according to the EMD matching.

15. The computer system of claim 10, wherein:
the frequencies of the search terms are determined by a number of users that searched for each of the search terms; and
the frequencies of the result terms are determined by a number of search results that include each of the result terms.

16. The computer system of claim 10, further comprising instructions for:
identifying, from the plurality of search terms, a plurality of pairs of search terms; and
weighting each of the pairs of search terms according to a number of common search results yielded by the pair of the search terms.

17. The computer system of claim 10, further comprising instructions for:
calculating a cost between a search term of the search terms and a result term of the result terms as a Euclidean distance between vectors representing the search term and the result term.

18. A non-transitory computer-readable storage medium storing one or more programs configured for execution by a computer system having at least one processor and memory, the one or more programs comprising instructions for:
tokenizing a plurality of terms from a plurality of search queries to obtain a plurality of search terms;
tokenizing a plurality of search results corresponding to the search queries, to obtain a plurality of result terms;
constructing a cost matrix for the plurality of search terms, wherein the cost matrix includes a plurality of entries and each of the entries represents a respective semantic similarity of a pair of search terms identified from the plurality of search terms, wherein constructing the cost matrix comprises:
identifying, from the plurality of search terms, a plurality of pairs of search terms having semantic similarity, wherein a pair of search terms is semantically similar when terms in the pair are generated by distinct queries and result in the same product selection;
assigning a respective joint probability for each of the identified pairs of search terms, the respective joint probability comprises a ratio of a number of product clicks of the identified pair of search terms and a total number of product clicks for all the pairs of search terms;
generating a plurality of term vectors based on the joint probabilities, each of the term vectors having a respective Euclidean distance, wherein a shorter Euclidean distance corresponds to greater semantic similarity; and
constructing the cost matrix that includes the plurality of term vectors;
generating a search terms distribution based on frequencies of the plurality of search terms;
generating a result terms distribution based on frequencies of the plurality of result terms;
performing an Earth Mover's Distance (EMD) matching between the search terms and the result terms based on the cost matrix, the search terms distribution, and the result terms distribution; and
evaluating the search terms based on the EMD matching to produce an evaluation of the search terms.

19. The non-transitory computer-readable storage medium of claim 18, wherein the one or more programs further comprise instructions for:
receiving a search prefix from a user; and
suggesting to the user at least one query based on the search prefix and the evaluation of the search terms.

20. The non-transitory computer-readable storage medium of claim 18, wherein the one or more programs further comprise instructions for:
identifying, from the plurality of search terms, a plurality of pairs of search terms; and
weighting each of the pairs of search terms according to a number of common search results yielded by the pair of the search terms.

* * * * *